United States Patent [19]

Marot et al.

[11] Patent Number: 5,056,953

[45] Date of Patent: Oct. 15, 1991

[54] ASSEMBLY DEVICE FOR ASSEMBLING DISMOUNTABLE OR MODULAR ELEMENTS

[75] Inventors: Jacques Marot, Eragny; Jean-Claude Boue, Aumale, both of France

[73] Assignee: Societe de Design et d'Agencement, Aumale, France

[21] Appl. No.: 465,083

[22] PCT Filed: May 9, 1989

[86] PCT No.: PCT/FR89/00226

§ 371 Date: Jan. 5, 1990

§ 102(e) Date: Jan. 5, 1990

[87] PCT Pub. No.: WO89/11043

PCT Pub. Date: Nov. 16, 1989

[30] Foreign Application Priority Data

May 11, 1988 [FR] France ............................... 88 06392

[51] Int. Cl.⁵ .............................................. F16B 9/00
[52] U.S. Cl. .................................... 403/194; 403/349; 403/195
[58] Field of Search ............... 403/349, 194, 195, 197, 403/193

[56] References Cited

U.S. PATENT DOCUMENTS

| | | |
|---|---|---|
| 3,338,605 | 8/1967 | Stoeber . |
| 3,661,411 | 5/1972 | Flick . |
| 3,851,601 | 12/1974 | Davis ............................. 403/349 X |
| 3,858,990 | 1/1975 | Busselmeier ....................... 403/194 |
| 3,869,218 | 3/1975 | Stoeber . |
| 3,890,022 | 6/1975 | Moon . |
| 4,101,232 | 7/1978 | Haapala ........................... 403/349 X |
| 4,756,638 | 7/1988 | Neyret ............................. 403/344 X |

FOREIGN PATENT DOCUMENTS

| | | |
|---|---|---|
| 8430322 | 4/1985 | Fed. Rep. of Germany . |
| 2557783 | 5/1986 | France . |
| 1402925 | 8/1975 | United Kingdom . |

*Primary Examiner*—Andrew V. Kundrat
*Attorney, Agent, or Firm*—Ladas & Parry

[57] ABSTRACT

The invention relates to an assembly device for elements of the type comprising a framework and at least one spacer or panel extending transversely to said framework. In accordance with the invention, the device comprises two assembly bodies (100, 200) insertable in respective hollow bars constituting a portion of the framework, each assembly body having a central locking portion (101, 201) capable of penetrating into a hole in a panel to be supported, together with a peripheral portion (102, 202) capable of bearing against one of the faces of said panel; the central locking portions (101, 201) constitute a sloping ramp bayonet coupling, thereby enabling said bodies to be deformed radially outwards by relative rotation between the two assembly bodies, thus locking them automatically in the associated hollow bars. The invention is applicable, in particular, to pieces of furniture for provision in kit form, and for various types of element and/or hollow bar.

20 Claims, 4 Drawing Sheets

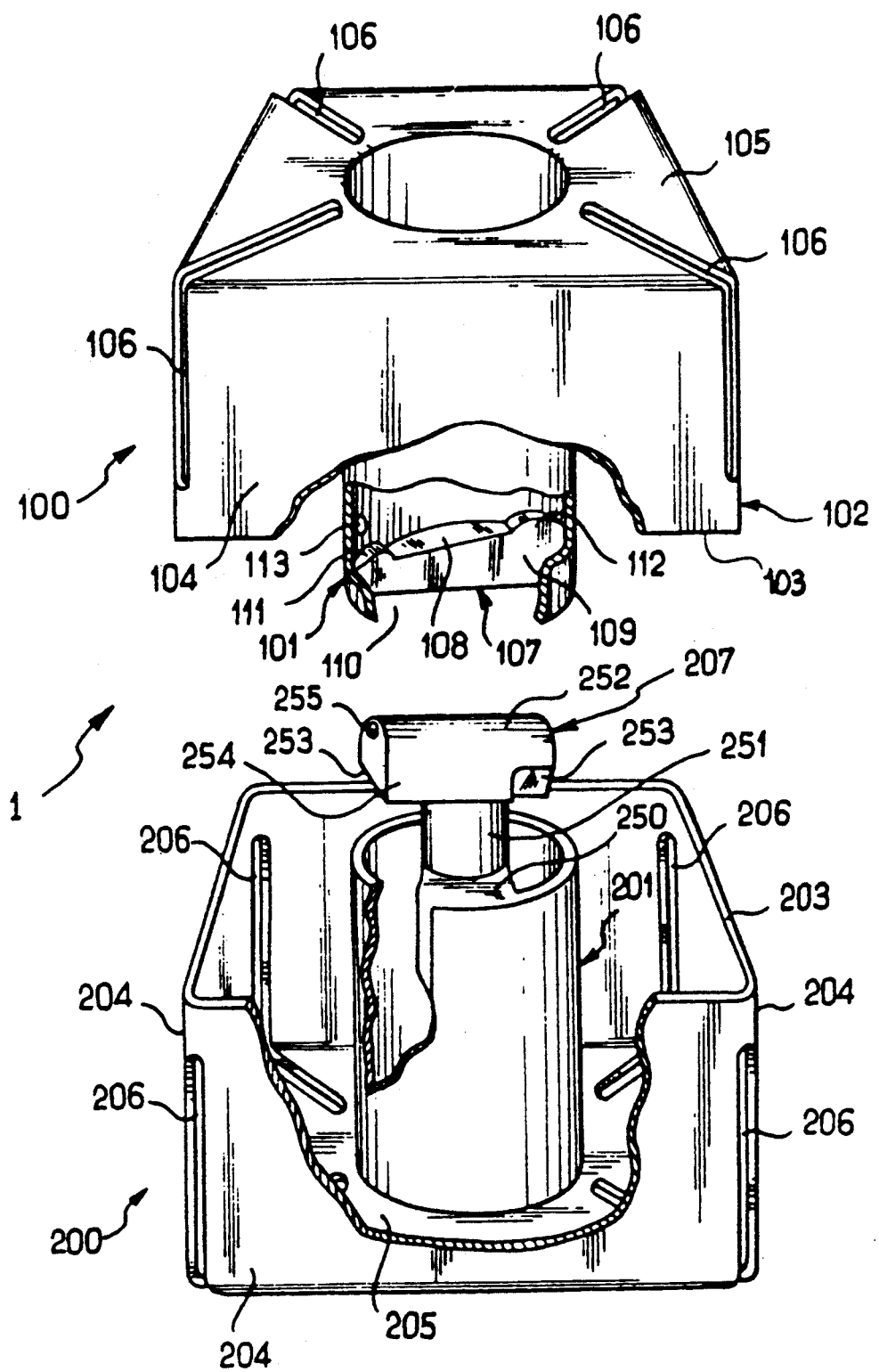
FIG_1

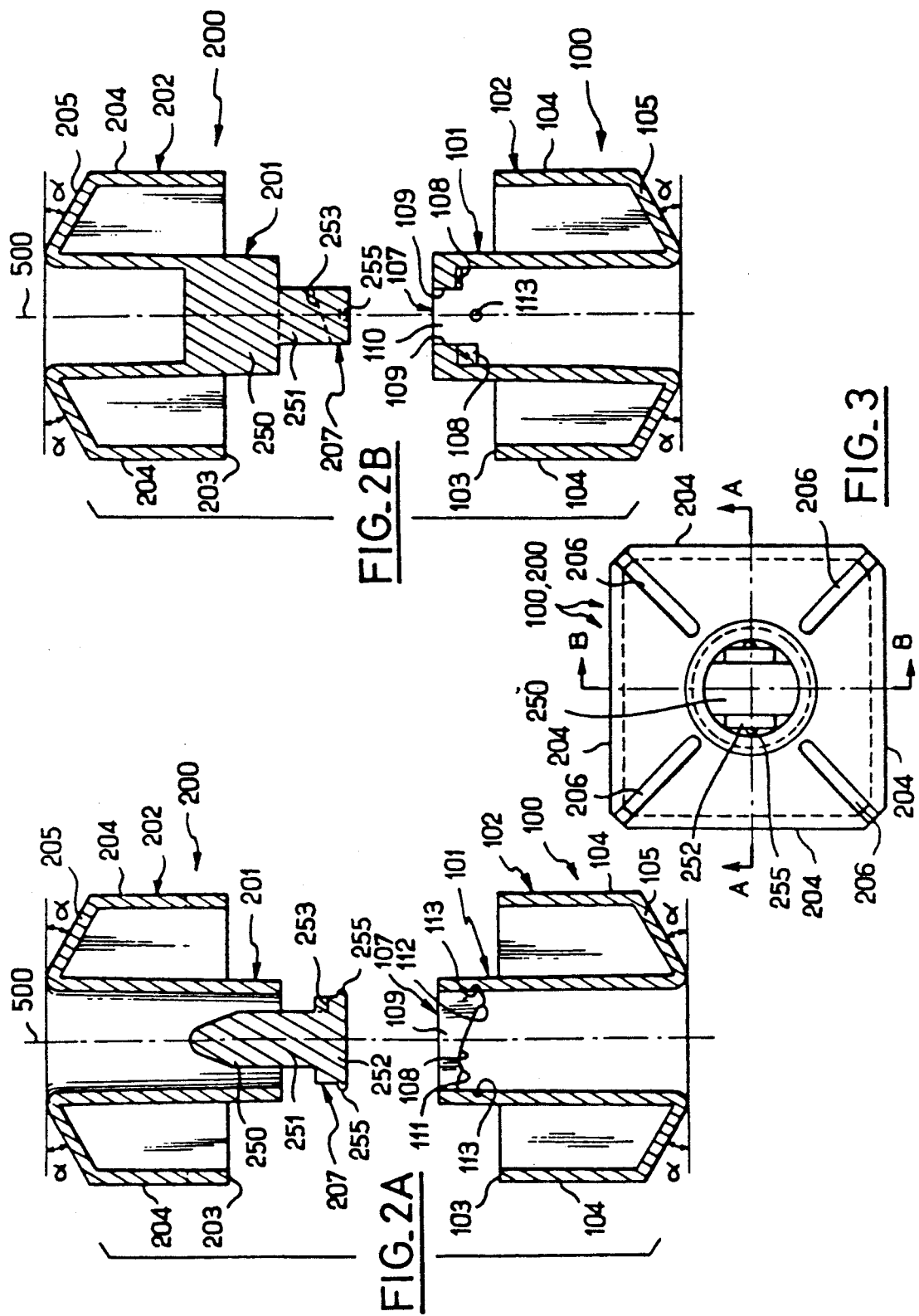

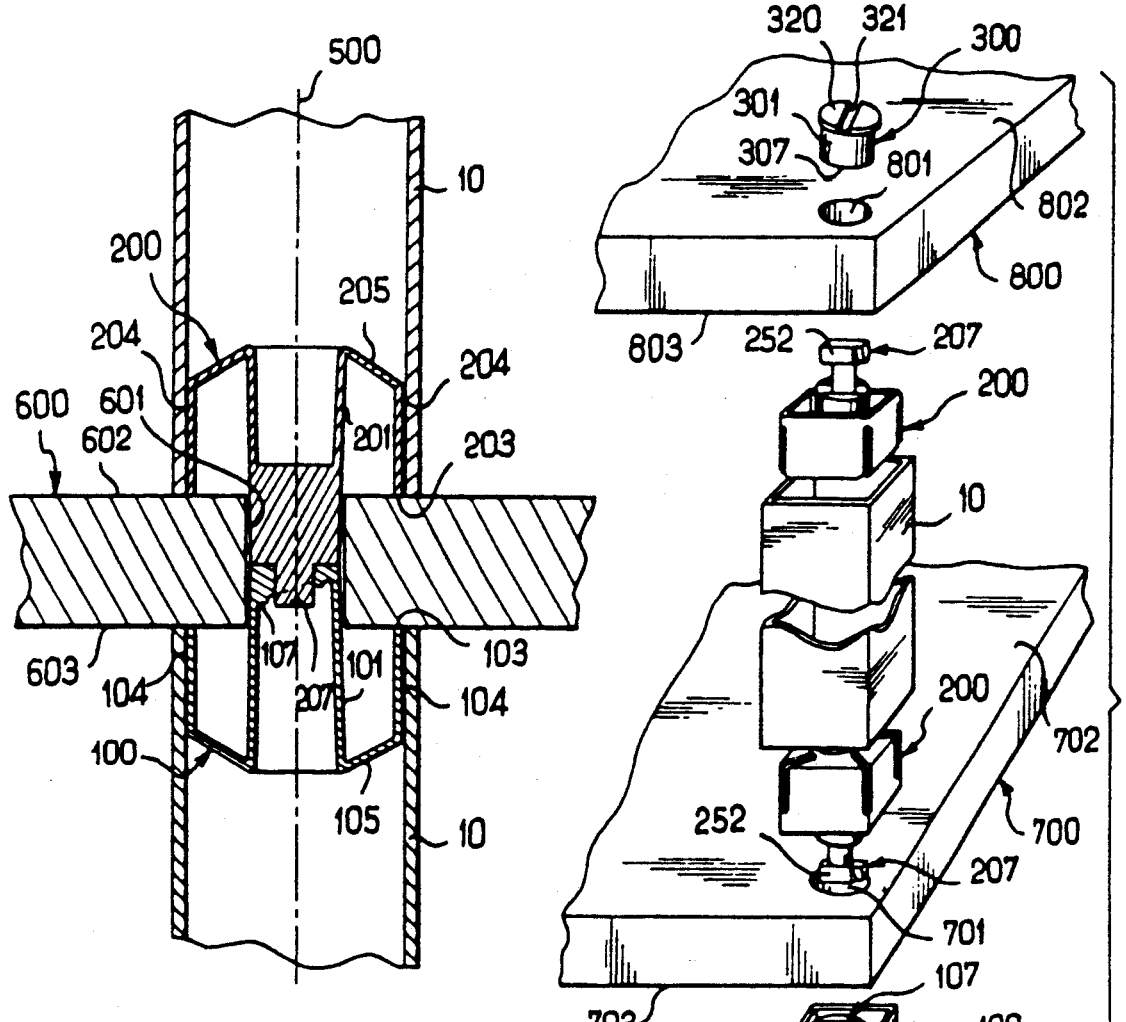
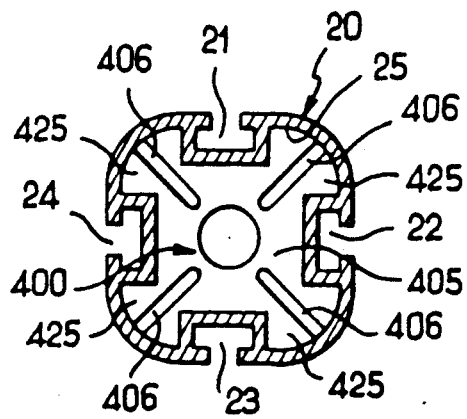
FIG. 6
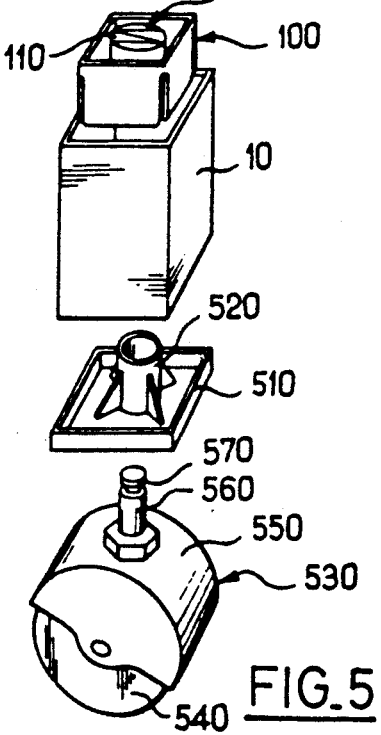

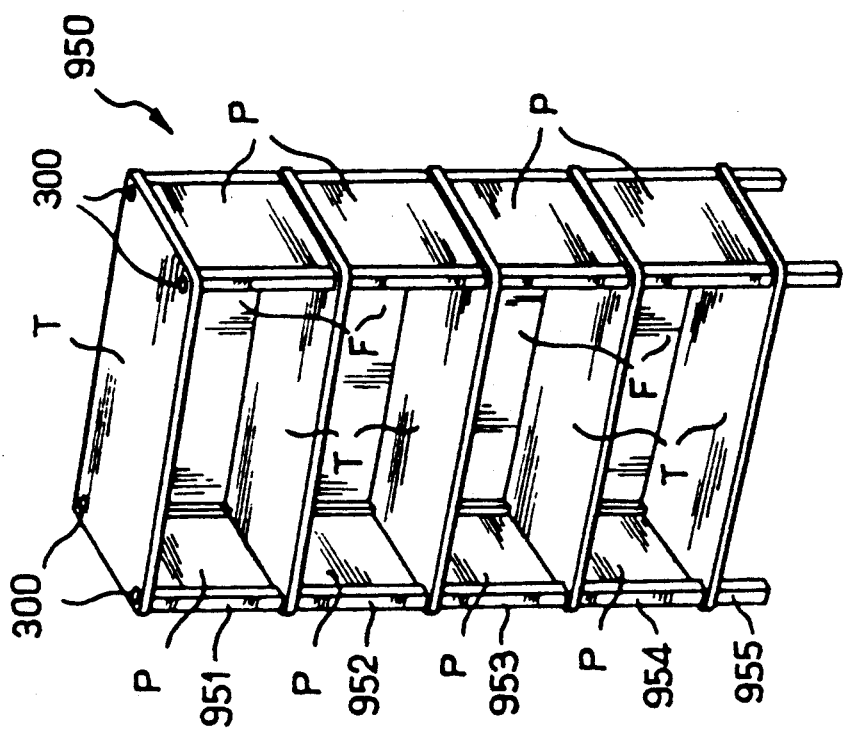
FIG._7B
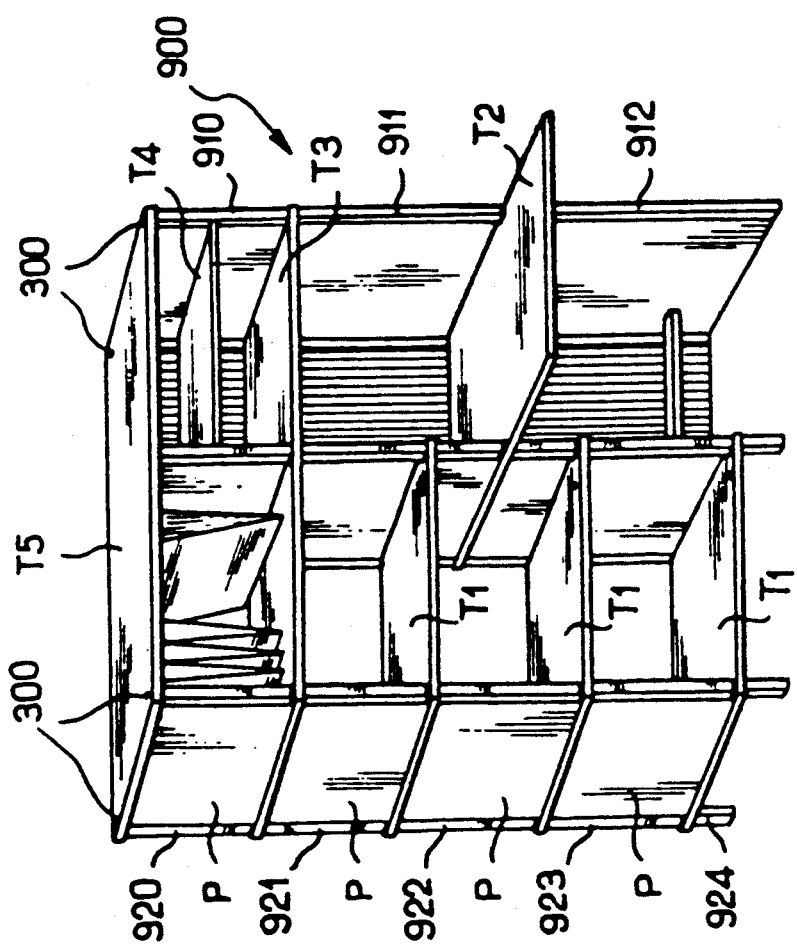
FIG._7A

ASSEMBLY DEVICE FOR ASSEMBLING DISMOUNTABLE OR MODULAR ELEMENTS

The invention relates to assembling dismountable or modular elements, in particular furniture elements in order to assemble furniture in kit form.

More precisely, the invention relates to an assembly device for assembling dismountable or modular elements, said elements being of the type comprising a framework and at least one spacer held by said framework and disposed substantially transversely relative thereto.

Numerous systems already exist for assembling a framework and spacers or panels in order to provide various dismountable or modular pieces of furniture.

Firstly there are systems using a sleeve and a screw at the end of two risers disposed on either side of a panel: one of the risers has a shoulder for supporting vertical forces and the panel is sandwiched between the two risers, with assembly being assembled merely by rotating one of said risers several times relative to the other, thereby screwing them together.

More generally, there are systems based on the principle of connection members glued or welded to the ends of risers or partitions. These systems go from very simple techniques using screws whose heads are received in the panel being screwed (round-headed wood screws) to more complex systems using an excentric type of locking catch (the catch is rotatable about an axis parallel to the axis of the partition and is rotatable by means of a tool so that its edge is received in a groove provided for this purpose in a connection member applied to the end of the riser).

Mention may also be made of systems having threaded endpieces applied to the ends of risers constituting portions of the vertical framework, such as the system described in French utility certificate number 2 557 783.

However, these various techniques suffer from several drawbacks.

In general, they are limited to round section frameworks since the relative positioning of successive risers (about their axes) is difficult to control (relative rotation when screwing items together is always subject to an angular positioning error once the items have been assembled and this is unfavorable with respect to the appearance of the finished piece of furniture).

In addition, assembly usually requires a special tool to be used, except for tubes having endpieces and screws applied thereto which are screwed together through a slab of wood (however this technique is expensive and not very reliable).

Mention may also be made of U.S. Pat. No. 3,338,605 which describes a support structure suitable for making storage items, tables, or separating partitions.

The structure described in this American patent is essentially constituted by a connection formed by three mutually lockable elements, which connection can be clamped to the rim of a wall inserted in a lateral notch in the connection. Clamping is obtained by co-operation between a ramp and a ridge provided on two of the three elements: it is then necessary to provide fluting and slots in order to provide two locks against rotation, in order to lock all three elements together.

Such a structure does not require a special tool, but it is complex and remains limited to end-to-end assembly with snap-fastening connections.

The state of the art is illustrated in general by British patent number 1 402 925, U.S. Pat. Nos. 3,869,218, 3,661,411, and 3,890,022, and by German utility model 84/30 322.

The various systems that have been developed for assembling panels and partitions together are not well adapted to assembling together the bars of a framework. In any event, these systems do not set out to ensure that the bars remain perfectly in alignment, which is nevertheless essential if the pieces of furniture are to support heavy loads.

Doubtless this explains why manufactures are not keen to split up a vertical load-carrying riser into a plurality of subassemblies, since they are well aware of the risks of damage that can arise from applying heavy loads to such pieces of furniture, particularly since such loads are generally not uniformly distributed. A particular consequence of this is that prepacked kits enabling purchasers to assemble pieces of furniture are themselves always at least as long as the one-piece risers are high (e.g. 1650 mm for office furniture which is 1650 mm high, or 1700 mm for a chest of drawers assembly which is 1700 mm high). Nevertheless, it is well known in this field that the size of packages constitutes a very important parameter.

The object of the invention is to provide an assembly device which avoids the drawbacks mentioned above while still being simple in design and reasonably cheap to produce.

Another object of the invention is to provide an assembly device which makes assembly quick and easy, and in particular which does not require any tool for assembling the items concerned or for taking them apart.

Another object of the invention is to provide an assembly device which is compatible with a very wide range of bar profiles without thereby complicating assembly while nevertheless ensuring that the bars are accurately aligned, both with respect to vertical alignment (which is essential for carrying forces safely) and for angular positioning (which is important for the appearance of the assembled piece of furniture).

Finally, an object of the invention is to provide an assembly device which remains completely hidden once assembly has been completed, thereby leaving the final appearance of the assembled piece of furniture unaffected.

More particularly, the present invention provides an assembly device for assembling dismountable or modular elements, said elements being of the type comprising a framework and at least one spacer held by said framework and disposed substantially transversely relative thereto, the assembly device being characterized by the fact that it comprises firstly a first assembly body insertable in a hollow bar constituting a portion of the framework, said first assembly body comprising a central locking portion capable of penetrating through a hole associated with the spacer, and a peripheral portion connected to said central portion and having a free edge capable of bearing against a face of said spacer in a zone surrounding the hole provided therethrough, and secondly a second assembly body capable of bearing against the opposite face of the spacer, said second assembly body having a central locking portion corresponding to the central locking portion of the first assembly body and likewise capable of penetrating into said hole in order to constitute a sloping ramp bayonet coupling, the peripheral portion of the first assembly body being, in addition, radially outwardly deformable under the effect of traction exerted on the central portion of said first assembly body, such that relative rotation of the two assembly bodies in order to couple them together provides such traction and thus automatically locks the first assembly body in the associated hollow bar.

It is advantageous to provide for the peripheral portion of the first assembly body to include parallel facets corresponding to at least some of the inside faces of the associated hollow bar, said facets being connected via a common central face to the central locking portion of said body; this applies, for example, when the cross-sections are polygonal, and in particular when they are square or rectangular.

It is advantageous for the first assembly body to have slits facilitating radial deformation thereof under the effect of traction exerted on the central locking portion of said body. In particular, the slits may be provided in the edges of the peripheral portion of the assembly body, and they may extend into the common central face of said body; more precisely, the slits may be organized in diagonal planes parallel to a common direction which corresponds to the central axis of the associated hollow bar.

In accordance with a particularly advantageous characteristic of the invention, the central locking portion of the first assembly body is substantially in the form of a cylindrical chimney terminating in a male or female sloping ramp bayonet coupling.

In a first case, the male coupling includes a projecting transverse head, said transverse head including at least one sloping bottom facette capable of co-operating with a sloping ramp provided on the corresponding central locking portion.

In a second case, the female coupling includes at least one inclined ramp disposed inside the chimney, said ramp being suitable for co-operating with the projecting transverse head provided on the corresponding central locking portion. Preferably, the sloping ramp is delimited by two snap-fastening ridges; in particular, the sloping ramp may be essentially plane and may extend perpendicularly to an inlet facette delimiting an orifice provided to receive the projecting transverse head of the corresponding central portion. In a variant which is preferred for reasons of reliability, the female coupling includes two sloping ramps symmetrically disposed about the axis of the chimney.

In accordance with a particularly advantageous characteristic, the sloping ramp bayonet coupling takes effect after the two assembly bodies have rotated through approximately one quarter of a turn relative to each other: it is then easy to see how such a system is quick and easy to implement compared with systems based on screws requiring the bars concerned to be rotated relative to one another through several rotations.

Preferably, the male and female sloping ramp bayonet couplings further include quick snap-fastening means enabling them to be temporarily locked together by axial displacement of the two assembly bodies prior to said bodies being rotated relative to each other; in particular, the quick snap-fastening means is constituted by a stud and dimple system, preferably having two studs on the projecting transverse head of the male coupling, and two dimples on the inside wall of the chimney carrying the female coupling.

In a particularly advantageous embodiment, the first and second assembly bodies are generally identical in structure, and differ from each other essentially only by the sloping ramp bayonet coupling; in particular, the two assembly bodies include respective peripheral portions such that identical hollow bars can be used on either side of the spacer in question, for example the peripheral portions of the assembly bodies are substantially square or rectangular in cross-section. In a variant, when the assembly device is associated with a section bar having angular internal voids, the peripheral portions of the assembly bodies being complementary in cross-section, having corresponding angular projections.

In another advantageous embodiment, the second assembly body is in the form of a cylindrical plug whose main portion constitutes the central locking portion terminated with male or female sloping ramp bayonet couplings, and whose remaining portion is essentially undeformable and constitutes both an abutment surface and a mask for hiding the bayonet coupling. This applies, for example, for the top end of a vertical framework whose appearance is to be preserved without being detrimental to the reliability of the assembly.

Finally, it is advantageous for each of the assembly bodies to be constituted by a single piece of plastic material, preferably obtained by injection molding: this gives rise to a highly satisfactory production cost even for complicated shapes (as applies to the above-mentioned variants having angular projections).

Other characteristics and advantages of the invention appear more clearly in the light of the following description relating to a particular embodiment and made with reference to the accompanying drawings, in which:

FIG. 1 is a perspective view showing two assembly bodies constituting an assembly device of the invention, with cut-away portions showing the structure thereof more clearly, in particular for the female bayonet coupling having a sloping ramp;

FIG. 2A is an axial section through the two bodies of FIG. 1 (the assembly body having a male bayonet coupling is, however, in this case shown above the body having the female coupling);

FIG. 2B is a similar axial section on a plane orthogonal to the preceding section;

FIG. 3 is a plan view of the same bodies (with FIGS. 2A and 2B being sections on A—A and B—B of FIG. 3);

FIG. 4 is an axial section through the device of the invention in association with two hollow bars on each side of the panel to be supported (the device is shown in its final position in this case, with an effective bayonet coupling linking together the two assembly bodies);

FIG. 5 is an exploded view showing an example of vertical organization of the component parts of a piece of furniture having casters and two horizontal slabs (one of the assembly bodies can be seen at the top in the form of a plug, whereas both bodies are substantially identical for the bottom panel which has two hollow square section bars bearing thereagainst);

FIG. 6 is a cross-section through another hollow section bar (which bar has angular internal voids and external T-slots for the rabbet of a wall, or for a positioning catch, or for a decorative strip insert), in which a complementary assembly body having angular projections is inserted, thereby encouraging the spread of clamping forces and also avoiding compressing the bottoms of the grooves; and FIGS. 7A and 7B show two examples of pieces of furniture that can easily be assembled using the device of the invention, with the device being used on all of the horizontal slabs.

DESCRIPTION OF PREFERRED EMBODIMENTS

The assembling devices described below makes it possible to assemble and dismount a very wide variety of dismountable or modular elements quickly. The elements in these examples to constitute furniture having a framework and at least one spacer held by said framework substantially transversely thereto. In the furniture, the spacer is generally in the form of a panel or a shelf. However, other applications such as stands or display units, for example, naturally may be envisaged in which the spacers are mere thrust washers.

Each assembly device of the invention is essentially constituted by first and second assembly bodies. The first assembly body is insertable into a hollow section bar that constitutes a portion of the framework and associated with the second assembly body so as to define a bayonet coupling having a sloping ramp. At least the first assembly body is such that relative rotation between the two assembly bodies for the purpose of the bayonet coupling also automatically locks the first assembly body in the associated hollow section bar. In the embodiment described in detail with reference to FIGS. 1 to 4, the first and second assembly bodies are almost identical in structure, and differ from each other solely by their male or female sloping ramp bayonet couplings. Naturally, other possible variants also exist, such as a variant in which the second assembly body is a cylindrical plug with a male or female sloping ramp bayonet coupling, as described below with reference to FIG. 5.

The assembly device 1 shown in FIGS. 1 to 3 comprises a first assembly body 100 and a generally corresponding second assembly body 200. As can be seen, the assembly bodies 100 and 200 differ from each other solely by their central locking portions 101, 102 that have respective male and female bayonet and sloping ramp couplings at first ends thereof. As a result, portions of the second assembly body 200 which correspond to portions of the first assembly body 100 are given the same reference numerals plus one hundred.

The first assembly body 100 has, in addition to its central locking portion 101, a peripheral portion 102. The peripheral portion 102 is constituted by facets 104 that are disposed at least generally correspondingly to at least portions of internal faces of the associated hollow section bar and parallel to a coupling axis of the central locking portion that extends from the first end thereof to an opposite, second end. These facets are connected to the second end of the central locking portion 101 by a common central face 105 and terminate at one edge (the bottom in FIG. 1) in a common free edge 103 that is spaced from the common central face in the direction (downward in FIG. 1) from the second to the first end of the central locking portion.

The central locking portion 101 is suitable for penetrating into a hole through a spacer panel (600 in FIG. 4) to be held, while the free edge 103 is suitable for bearing against a face of said panel surrounding the hole. As a result and in accordance with an essential characteristic of the invention, the peripheral portion 102 of the first assembly body 100 is radially outwardly deformable by axial traction on the central locking portion 101 in the direction the free edge is spaced from the central face. Thus, if the assembly body 100 is inserted in an associated hollow section bar of corresponding cross-section so that the facets 104 come adjacent to the inside faces of the hollow section bar, then when traction is exerted on the central locking portion 101 in in the direction from the central face 105 to the free edge 103 on the face of the panel, the traction deforms the central face, and thus, radially outwards, the facets 104 of the peripheral portion 102. This radially outwards deformation or expansion has the effect of pressing each of the parallel facets 104 firmly against the corresponding inside faces of the hollow section bar, thereby ensuring reliable locking without assistance from any tool.

It is advantageous for this to provide the first assembly body 100 with slits 106 between the facets 104 and extending into the common central face 105. Such a configuration is further advantageous in that as it leaves a continuous bottom strip adjacent to the free edge 103 of the peripheral portion 102, thereby maintaining mechanical integrity of the assembly during radial deformation of the peripheral portion. It will also be observed that the slits 106 are disposed in diagonal planes extending parallel to a common direction which corresponds to the central axis of the associated hollow section bar. Naturally a degree of symmetry is advantageous insofar as the radial deformation of the peripheral portion of the assembly body then occurs in the same way for each of the side facets of said body. The isotropic nature of such deformation helps to center the hollow section bar relative to the axis of the central locking portion 101, and thus to align two adjacent bars on either side of a panel held between them.

The central locking portion 101 of the first assembly body 100 is, in this case, substantially in the form of a cylindrical chimney terminating in a sloping ramp bayonet coupling (female in this case). The cylindrical chimney connects directly to the common central face 105 via a connection constituting the fastening point enabling the peripheral portion of the body to be deformed radially outwards under the effect of traction exerted on the central portion 101. The cut-away at the end of the cylindrical chimney shows the exact structure of the sloping ramp bayonet coupling (with the portion taken away being identical to the portion that is visible, the cylindrical chimney having axial symmetry about its axis). The female coupling given a general reference 107 includes at least one sloping ramp 108 disposed inside the chimney 101, said ramp being intended to co-operate with a projecting head provided on the corresponding central locking portion of the other assembly body. The sloping ramp 108 is essentially plane in this case, extending perpendicularly to an inlet facette 108 delimiting an orifice 110 provided for receiving the projecting head of the corresponding central portion. Two snap-fastening ridges 111 and 112 can also be seen, and their function is described below. In practice, two sloping ramps 108 are preferably provided, disposed with axial symmetry about the axis of the cylindrical chimney.

The structure of the second assembly body 200 is now described, and in particular the structure of the male coupling which, in association with the above-described female coupling, serves to define a sloping ramp bayonet coupling.

The assembly body 200 comprises, like the first assembly body 100, a central locking portion 201, and a peripheral portion 202 connected to said central portion and having a free edge 203. The peripheral portion 202 includes parallel facets 204 which are connected via a common central face 205 to the central locking portion of said body. Slits 206 can also be seen for facilitating radial deformation of the assembly body 200 under the effect of traction exerted on the central locking portion 201 thereof. As before, the slits 206 are provided in the edges of the peripheral portion 202 of the assembly body and they extend into the common central face 205 thereof, with said slits being organized on two diagonal planes parallel to a common direction which corresponds to the central axis of the hollow section bar associated with the assembly body. The central locking portion 201 is similarly in the form of a chimney which is hollow like the central portion of the other assembly body, however this chimney is terminated by a male coupling 207. Thus, going from the central portion 250 of the cylindrical chimney 202 there can be seen a coaxial cylindrical appendix 251 projecting beyond the plane of the free edge 203. The appendix 251 carries a projecting transverse head 252 whose general cross-section (in a plane perpendicular to the axis of the chimney) corresponding substantially to the cross-section of the inlet orifice 110 provided in the corresponding central portion 101 of the assembly body 100. The top edge of the projecting transverse head 252 is preferably rounded, running smoothly into two side faces 252, which faces come into contact with the inlet facets 209 delimiting the above-mentioned orifice 110. It is also advantageous to provide for the transverse head 252 to include at least one sloping bottom facette 253 suitable for co-operating with the sloping ramp 108 provided in the corresponding central locking portion 101. In order to engage both sloping ramps 108 provided in the assembly body 100, two sloping bottom facets 253 are naturally provided and are disposed with axial symmetry about the axis of the chimney 201. Naturally, the slope of these facets 253 corresponds to the slope of the associated sloping ramps 108.

The sloping ramp bayonet coupling 107, 207 operate as follows. Once the projecting transverse head 252 has penetrated far enough through the orifice 110, relative rotation between the assembly bodies 100 and 200 causes each sloping bottom facette 253 to engage the first snap-fastening ridge 111. By continuing rotation, the facets 253 go past the ridge 111 and then engage the associated sloping ramp 108, with the second ridge 112 then constituting an abutment preventing any further relative rotation between the two bodies. It can thus be seen that the sloping ramp bayonet coupling of the invention takes effect after the two assembly bodies 100 and 200 have rotated relative to each other through about one fourth of a turn. This shows how the system of the invention is quick and easy compared with prior systems requiring section bars having end inserts for screw connection to be rotated through several full revolutions.

It is also advantageous to provide for the male and female sloping ramp bayonet couplings 207 and 107 to be provided with quick snap-fastening means enabling temporary locking to be obtained by axial snap-fastening of the two assembly bodies 100 and 200 prior to rotating said bodies relative to each other. One possible example of such rapid snap-fastening means is illustrated using a system of studs and dimples. Thus, there are two studs 255 on the projecting transverse head 252 of the male coupling 207 and two corresponding dimples 113 on the inside wall of the chimney 101 carrying the female coupling 107. In FIG. 1, the position of the dimple 113 is deliberately offset in order to make it visible, and in fact it is situated in the cut-away portion of the chimney 101. Thus, merely moving the two assembly bodies 100 and 200 towards each other so that the projecting transverse head 252 is inserted into the orifice 110 suffices to obtain temporary interconnection by axial snap-fastening between the two bodies. Naturally, the dimensions of the component parts of the assembly bodies are selected in such a manner that each of these bodies is in contact with one of the faces of the panel to be held when said bodies are temporarily fastened together by the axial snap-fastening, such that relative rotation of the bodies has little clearance to take up and is essentially concerned with providing the radial outwards deformation of the peripheral portions of the bodies.

As can be seen in FIG. 3, the sections of FIGS. 2A and 2B improve understanding of the exact structure of the assembly bodies 100 and 200. It can be seen that each of the assembly bodies 100 and 200 is constituted in this case by a single piece which is preferably made by injection molding plastic material. The sections of FIGS. 2A and 2B show that the common central faces 105 and 205 of the assembly bodies 100 and 200 are at an angle $\alpha$ relative to a plane perpendicular to the common axis 500 of the assembly bodies. The person skilled in the art will readily understand that such an angle $\alpha$ is advantageous for obtaining optimum sideways and outwards deformation of the peripheral portions of the assembly bodies. For assembly bodies having a thickness of about one millimeter, the angle $\alpha$ is preferably selected to be close to 30°. These figures thus clearly show the structure of the component parts of each of the assembly bodies, which component parts are recalled below. The assembly body 100 has a central locking portion 101, a peripheral portion 102 connected to said central portion and having a free edge 103, parallel facets 104 connected via a common central face 105 to the central locking portion 101, and slits 106 facilitating radial deformation of the body under the effect of traction exerted on the central locking portion 101 of said body. There is also a female sloping ramp bayonet coupling 107 having two sloping ramps 108 extending perpendicularly to an inlet facette 109 delimiting an orifice 110, with each sloping ramp 108 being delimited by two snap-fastening ridges 111 and 112. Finally, the assembly body 100 has two dimples 113 for fast snap-fastening in an axial direction between the two assembly bodies 100 and 200. Similarly, the assembly body 200 has a central locking portion 201, a peripheral portion 202 connected to said central portion and having a free edge 203, parallel facets 204 connected via a common central face 205 to the central locking portion 201 of the assembly body, and slits 206 facilitating radial deformation of said body. There can also be seen a male sloping ramp bayonet coupling 207 having a projecting transverse head 252 having two sloping bottom facets 253 and two studs 255 for rapid snap-fastening after axial displacement.

The axial section of FIG. 4 shows how the device of the invention is used for assembling two hollow section bars on either side of a panel to be supported.

There can thus be seen a panel 600 having a hole 601 through which the central locking portions of the two assembly bodies in question can penetrate. The two faces of the panel 602 and 603 respectively constitute a top face and a bottom face. The section shows two assembly bodies 100 and 200 as described above so only the main references thereon are repeated in order to avoid overcrowding the figure.

When parts are to be assembled, the two assembly bodies 100 and 200 are presented on either side of the panel 600 and their central locking portions 101 and 102 are inserted into the hole 601 in the panel, thereby enabling temporary locking to be obtained by axially snap-fastening these two bodies together. In this temporarily-locked position, the edges 103 and 203 of the assembly bodies 100 and 200 make contact respectively with the bottom and top faces 603 and 602 of the panel 600 to be supported (to within manufacturing tolerances). A hollow section bar 10 is then disposed on each of the assembly bodies, after which the two bars are rotated relative to each other, thereby giving rise to relative rotation of the two assembly bodies and thus engaging the sloping ramp bayonet couplings between the two central locking portions 101 and 201. As explained above, by virtue of the edges 103 and 203 coming into abutment against the panel 600, the traction exerted on the central portions 101 and 201 gives rise to radial outwards deformation of each of the assembly bodies, thereby automatically locking each of these bodies in the associated hollow section bar. The process is extremely simple since it suffices merely to rotate one of the two bars through a quarter turn and no external tool is needed. When an assembly made in this way is to be disassembled, it suffices merely to rotate the two bars 10 in question in the opposite direction, and then disengage the assembly bodies which become accessible after the hollow bars have been removed.

FIG. 5 shows the vertical organization of various component parts of a piece of furniture having casters and two horizontal slabs, and making use of several assembly devices of the invention. This organization also serves to illustrate a possible variant of the invention in which an assembly body referenced 300 is in the form of a cylindrical plug whose main portion 301 constitutes the central locking portion terminated by a male or female sloping ramp bayonet coupling 307 (not visible in FIG. 5), with the remainder thereof being essentially undeformable and constituting both an abutment and a mask hiding the bayonet coupling. The top portion of the plug-forming assembly body has means for preventing it from rotating, e.g. a slot 321. It is generally preferable for such an assembly body in the form of a cylindrical plug to be provided with sloping ramp bayonet coupling of the female type. The assembly process is entirely similar to that described with reference to FIG. 4. For the top slab 800 having a hole 801 and faces 802 and 803, it suffices to bring together a plug 300 and an assembly body 200 having corresponding sloping ramp bayonet couplings. After the assembly bodies have been temporarily locked together by axial snap-fastening, a hollow bar 10 is put into place on the locking body 200 and then said assembly body 200 is rotated relative to the plug 300 in order to obtain automatic locking between the hollow bar and the assembly body inserted therein by rotation through a quarter turn only. The procedure for the bottom slab 700 having a hole 701 and faces 702 and 703 is exactly the same as that described with reference to FIG. 4, where two assembly bodies 100 and 200 having inclined slope bayonet couplings are used. After the two assembly bodies 100 and 200 have been snap-fastened to each other by axial displacement, the corresponding hollow bars 10 are put into place and the two bars are caused to rotate relative to each other through a quarter turn in order to obtain secure locking on either side of the slab 700. At the bottom end, there are units which are conventional in this field, serving to receive wheels: these units comprise a bottom plug 510 and caster means 530 having wheels 540 and a housing 550, said housing having a rod 560 extending upwards with a groove 750 for connection to the plug 510 by means of an inwardly projecting rim snapping therein (not shown).

Naturally numerous variants are possible, in particular for fixing to a very wide range of hollow section bars. The section of FIG. 6 thus shows a hollow bar 20 of a different type having external T-slots 21, 22, 23, and 24 and internal angular spaces 25. Such bars are advantageous since their external slots can be used for receiving supporting catches or for receiving the rabbet of a wall, or indeed for receiving a decorative strip. The use of such hollow bars presents no difficulty in the context of the present invention. Although assembly bodies as described with reference to FIG. 1 could be used, it is preferable to provide assembly bodies having the same cross-section as the hollow bar, thereby spreading the clamping forces better while avoiding compressing the bottoms of the grooves. Thus, FIG. 6 shows an assembly body 400 whose peripheral portion has a complementary cross-section with angular projections 425 corresponding to the angular voids 25 in the hollow bar 20. As before, it is advantageous to provide slits 406 organized on diagonal planes parallel to a common direction corresponding to the central axis of the associated hollow bar 20.

More generally, and regardless of the substance used for making the bars, the invention makes it possible to solve assembly problems using a very wide variety of hollow bars, which bars are preferably polygonal in cross-section. It is nevertheless advantageous to select assembly bodies which have cross-sections that are as complementary as possible to the inside sections of the hollow bars so as to spread out clamping forces uniformly, thereby avoiding compressing the bottoms of the grooves when the bars are provided with grooves (as shown in FIG. 6). When using hollow bars of round external section, it is advisable to provide facets therein defining a polygonal profile inside the bar (which can be done by placing an insert in each bar end).

The invention thus makes it possible to provide an assembly device which is simple in design and reasonable in production cost. The assembly device makes assembly quick and easy, and in particular no tools are required for assembling or dismounting the corresponding pieces of furniture. At worst, it will be necessary to provide locking means for use in the special case of an assembly body in the form of a plug (as shown in FIG. 5). It is important to observe that the device of the invention makes it possible to ensure that hollow bars are kept accurately in alignment, both longitudinally which is essential for carrying vertical forces, and with respect to angular positioning which may be of great importance for the final appearance of the assembled pieces of furniture. In addition, with respect to appearance, it should be observed that the assembly device is completely invisible once assembly is completed.

FIGS. 7A and 7B show two pieces of furniture that can easily be assembled using the device of the invention, with said device being used on all of the horizontal slabs. Thus, in FIG. 7A, there can be seen a desk-type piece of furniture 900 having walls P, and slabs T1, T2, T3, T4, and T5. The vertical framework of such a desk is easily provided using assembly devices of the invention, with such assemblies building up the required vertical risers. Thus, by way of example, for the slab T2 forming a writing surface, bars 911 and 912 constitutes a supporting riser, with bar 910 finishing off the complex vertical riser. On the other side of the desk 900, a vertical riser is built up from bars 924, 923, 922, 921, and 920 thus constituting a single column having excellent load-carrying properties. The height of a piece of furniture is thus built up using such risers without reducing riser stiffness. In addition, this design makes it possible to provide prior packaging which is much less bulky than would be the case for similar pieces of furniture assembled using the above-mentioned conventional systems. For such a desk which may be 1650 mm high, the longest dimension of the package will be determined by the length of the top slab T5 which is generally 1250 mm, whereas using prior techniques there was no way of making a package shorter than 1650 mm. The presence of plugs 300 on the top slab T5 should also be observed.

FIG. 7B shows a different piece of furniture constituting a set of shelves 950 built up from slabs T, walls P, and backpieces F. As before, each of the vertical risers is built up by assembling successive lengths of hollow bar 955, 954, 953, 952, and 951. Here again, there are plugs 300 on the top slab. As before, for a set of shelves 1700 mm high, having individual shelves which are 800 mm wide and 300 mm deep, the longest dimension of the package is only 800 mm, whereas prior techniques cannot reduce package size below a length of 1700 mm.

Naturally, the invention is not limited in any way to the embodiments described above, but on the contrary covers any variant which uses equivalent means to reproduce the essential characteristics specified in the claims.

Thus, for example, conical interfitting systems could be used for obtaining the radial expansion of at least one of the assembly bodies, or systems could be used having metal inserts glued to a structure molded in plastic material or elastomer material in order to obtain the desired radial deformation.

In other applications, e.g. when making structures for stands, the invention also makes it possible to assemble bars to same-section multiple connectors, in which case the spacer of the assembly device is reduced to a mere thrust washer disposed between each bar and/or multiple connection branch.

We claim:

1. An assembly device for assembling dismountable or modular furniture elements, said elements being of the type comprising a framework and at least one rigid spacer held by said framework and disposed substantially transversely relative thereto, the said assembly device comprising:
   a first assembly body (100) insertable in a hollow bar (10) constituting a portion of the framework, said first assembly body comprising a central locking portion (101) a first end of which is capable of penetrating through an associated hole of the spacer, said central locking portion further including first coupling means (107) at said first end, and a deformable peripheral portion (102) connected to said central locking portion via a central face (105) which projects from a second end of said central locking portion opposite said first end of said central locking portion, said peripheral portion having a free edge (103) capable of bearing against a first face of said spacer in a zone surrounding the hole provided therethrough, and
   a second assembly body (200) having a free edge (203) capable of bearing against a second face of the spacer opposite said first face, and said second assembly body further having a central locking portion (201) associated to said central locking portion (101) of said first assembly body (100) and likewise having a first end which is capable of penetrating into said hole, said central locking portion (201) of said second assembly body further including second coupling means (207) at said first end thereof, said first and second coupling means constituting a sloping ramp bayonet coupling (107, 207); and
   wherein said peripheral portion (102) of said first assembly body (100) is radially outwardly deformable under the combined effect of a bearing of the free edge (103) thereof against said first face of said spacer and of a traction exerted on said central locking portion (101) of said first assembly body, such that a relative rotation of the two assembly bodies (100, 200) in order to couple them together through said sloping ramp bayonet coupling (107, 207) exerts said traction of said central locking portion (101) of said first assembly body, and consequently produces said radial outward deformation of said peripheral portion (102) of said first assembly body, so that said relative rotation automatically locks said first assembly body (100) in the associated hollow bar (10), and furthermore locks said spacer between said free edge (103) of said first assembly body and said free edge (203) of said second assembly body.

2. An assembly device according to claim 1, wherein the central locking portion (101) of the first assembly body is cylindrical to define a central axis thereof, and wherein the peripheral portion (102) of the first assembly body (100) includes planar facets (104) which are substantially parallel to the central axis of the central locking portion, the planar facets projecting from the central face of the first assembly body and corresponding to at least some inside faces of the associated hollow bar.

3. An assembly device according to claim 2, characterized by the fact that the first assembly body (100) has slits (106) facilitating radial deformation thereof under the effect of traction exerted on the central locking portion (101) of said body, the slits (106) being provided in corner edges of the peripheral portion (102) of the assembly body, and extending into the common central face (105) of said body.

4. An assembly device according claim 3, characterized in that the slits (106) are organized in diagonal planes that intersect the central axis of the central locking portion (101) of the first assembly body.

5. An assembly device according to claim 1, characterized by the fact that the central locking portions (101, 102) of the first and second assembly bodies (100, 200) are both substantially in the form of a cylindrical chimney defining at respective first ends thereof a male and a female sloping ramp bayonet coupling (207, 107).

6. An assembly device according to claim 5, characterized by the fact that the male coupling (207) includes a projecting transverse head (252), said transverse head including at least one sloping bottom facette (253) capable of co-operating with a sloping ramp (108) provided on the corresponding central locking portion (101).

7. An assembly device according to claim 5, characterized by the fact that the female coupling (107) includes at least one inclined ramp (108) disposed inside the chimney, said ramp being suitable for co-operating with the projecting transverse head (252) provided on the corresponding central locking portion (201).

8. An assembly device according to claim 7, characterized by the fact that the sloping ramp (108) is delimited by two snap-fastening ridges (111, 112).

9. An assembly device according to claim 7, characterized by the fact that the sloping ramp (108) is essentially plane and extends perpendicularly to an inlet facette (109) delimiting an orifice (110) provided to recieve the projecting transverse head (252) of the corresponding central portion (201).

10. An assembly device according to claim 7, characterized by the fact that the female coupling (107) includes two sloping ramps (108) symmetrically disposed about the axis of the chimney (101).

11. An assembly device according to claim 5, characterized by the fact that the sloping ramp bayonet coupling takes effect after the two assembly bodies (100, 200) have rotated through approximately one quarter of a turn relative to each other.

12. An assembly device according to claim 5, characterized by the fact that the male and female sloping ramp bayonet couplings (207, 107) further include quick snap-fastening means (255, 113) enabling them to be temporarily locked together by axial displacement of the two assembly bodies (100, 200) prior to said bodies being rotated relative to each other.

13. An assembly device according to claim 12, characterized by the fact that the quick snap-fastening means is constituted by a stud and dimple system, preferably having two studs (255) on the projecting transverse head (252) of the male coupling (207), and two dimples (113) on the inside wall of the chimney (101) carrying the female coupling (107).

14. An assembly device according to claim 1, characterized by the fact that the first and second assembly bodies (100, 200) are generally identical in structure, and differ from each other essentially only by the sloping ramp bayonet coupling (107, 207).

15. An assembly device according to claim 14, characterized by the fact that the two assembly bodies (100, 200) include respective peripheral portions (102, 202) such that identical hollow bars (10) can be used on either side of the spacer in question.

16. An assembly device according to claim 15, characterized by the fact that the peripheral portions (102, 202) of the assembly bodies (100, 200) are substantially square or rectangular in cross-section.

17. An assembly device according to claim 15, associated with a hollow bar (20) having angular internal voids (25), the assembly device being characterized by the fact that the peripheral portions of the assembly bodies (400) are complementary in cross-section, having corresponding angular projections (425).

18. An assembly device according to claim 1, characterized by the fact that the second assembly body (300) is in the form of a cylindrical plug whose main portion constitutes the central locking portion (301) terminated with male or female sloping ramp bayonet couplings (307), and whose remaining portion (320) is essentially undeformable and constitutes both an abutment surface and a mask for hiding the bayonet coupling.

19. An assembly device according to claim 1, characterized by the fact that each of the assembly bodies (100, 200, 300, 400) is constituted by a single piece of plastic material, preferably obtained by injection molding.

20. An assembly device for assembling a hollow-section bar and a spacer member, the assembly device comprising:

first and second assembly bodies having free edges of peripheral portions respectively for bearing against opposite faces of a spacer member and central locking portions having first ends for entering a hole through the spacer member when the free edges of the peripheral portions bear against the opposite faces of the spacer member, the peripheral portion of the first assembly body comprising deformable facet members for disposition in correspondence with at least portions of inner faces of a hollow section of a bar, whereby to rotate the first assembly body with the bar when the facet members are disposed in the hollow section of the bar and the bar is rotated, edges of the facet members being connected together into the free edge of the peripheral portion of the first assembly body;

a common central face member connected to a portion of each of the facet members that is spaced from the free edge of the peripheral portion of the first assembly body toward a second end of the central locking portion of the first assembly body that is opposite the first end thereof; and coupling means on the first ends of the central locking portions of the first and second assembly bodies, the coupling means comprising a bayonet and a sloping ramp for progressively coupling the central portions together when the first and second assembly bodies are relatively rotated, whereby rotation of the first assembly body with the bar when the free edges of the peripheral portions of the first and second assembly bodies bear against the spacer member and the central locking portions of the first and second assembly bodies are in the hole through the spacer member progressively tractions the central locking member and connected common central face member of the first assembly body in the direction from the second to the first end of the central locking member and, thereby, deforms the facet members radially outwards into firm engagement with the inner faces of the hollow section of the bar.

* * * * *